Dec. 11, 1962     I. R. BARR     3,067,967

FLYING MACHINE

Filed Nov. 19, 1958     3 Sheets-Sheet 1

INVENTOR.
IRWIN R. BARR
BY
ATTORNEYS

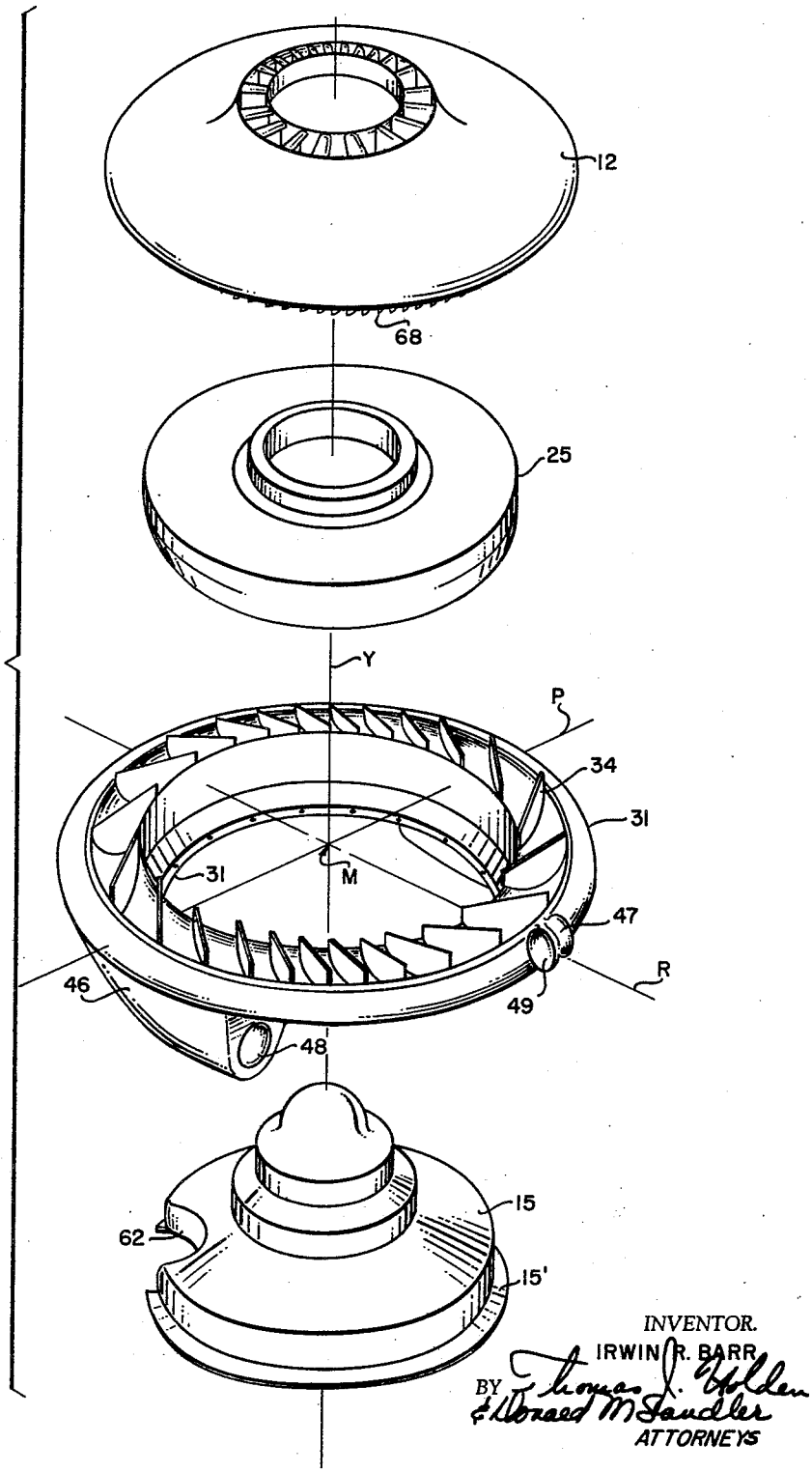

Dec. 11, 1962 I. R. BARR 3,067,967
FLYING MACHINE
Filed Nov. 19, 1958 3 Sheets-Sheet 3

INVENTOR.
IRWIN R. BARR
BY Thomas J. Holden
& Donald M. Sandler
ATTORNEYS

United States Patent Office 3,067,967
Patented Dec. 11, 1962

3,067,967
FLYING MACHINE
Irwin R. Barr, Chapman Road, Kingsville, Md.
Filed Nov. 19, 1958, Ser. No. 774,956
7 Claims. (Cl. 244—12)

This invention relates generally to flying machines, and more particularly to flying machines of the type which can take off and land, hover, travel at high speeds, and quickly turn and maneuver in azimuth heading.

A primary object of this invention is to provide a flying machine of the class described in which reducing the empty weight while maintaining the gross weight for increasing payload capacity does not result in reduced aerodynamic performance of the flying machine.

Another object of this invention is to provide a flying machine of the class described in which gyroscopic couples may be utilized for increasing stability during hovering without requiring the empty weight of the flying machine to be increased.

Another object of this invention is to provide a flying machine of the class described which has increased stability and maneuverability during all phases of its travel.

As a feature of this invention, whereby the objects thereof are achieved, a part of the structure of the power plant forms a part of the aerodynamic lifting surface of the airframe. Stated otherwise, a portion of the power plant is common to both the power plant and to the airframe. By a novel integration of power plant with airfoil, the entire upper portion of the airfoil which is normally a part of the airframe is eliminated and replaced by a portion of the power plant. Since the weight of the replaced airfoil is eliminated, a significant reduction in airframe weight is achieved while the same gross weight can be maintained. Thus, the payload of the flying machine can be increased by the amount of the weight of the airfoil eliminated. However, the flying machine presents substantially the same appearance to ambient air such that aerodynamic performance is not reduced. In fact, such performance is appreciably increased.

As another feature of this invention, the integration of power plant with airframe causes the rotating parts of the power plant to have an angular momentum sufficient to give rise to gyroscopic couples which exert an inherent stabilizing influence on the flying machine, particularly when hovering. In such construction, moments or forces acting on a flying machine made in accordance with the invention and arising from atmospheric disturbances and the like, cause small deviations of the machine from its equilibrium position to be decreased rather than increased as is the case for conventional flying machines. Inherent stability in hovering is, therefore, achieved with only the angular momentum of the power plant being utilized.

The more important features of this invention have thus been outlined rather broadly in order that the detailed description thereof that follows may be better understood, and in order that the contribution to the art may be better appreciated. There are, of course, additional features of the invention that will be described hereinafter and which will also form the subject of the claims appended hereto. Those skilled in the art will appreciate that the conception upon which this disclosure is based may readily be utilized as a basis for designing other apparatus for carrying out the several purposes of this invention.

FIGURE 4 is an exploded view of the various major components making up the flying machine.

Figure 1:
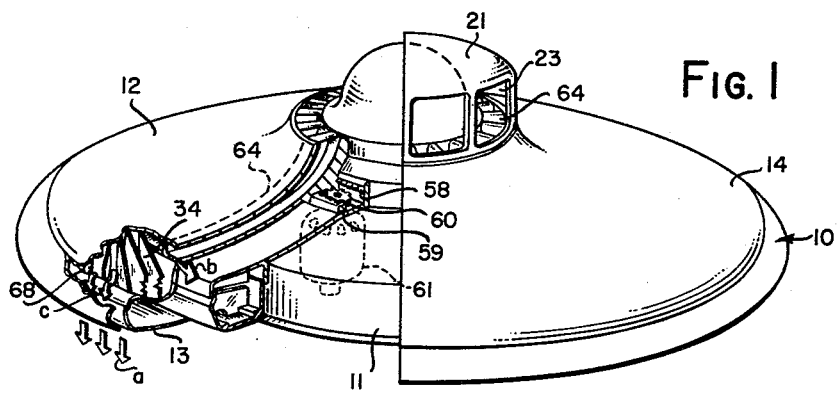
FIGURE 1 is a cut-away section of a flying machine made in accordance with this invention.
Figure 3:
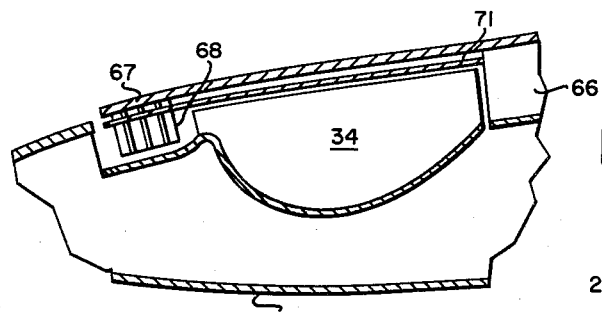
FIGURE 3 is a view of the combustion chamber looking normal to the flame holders.

Referring now more particularly to the drawing, a flying machine 10 embodying the present invention is shown in FIGURE 1 as a stator 11 and a rotor 12 mounted on top of said stator for rotation about central axis Y. Stator 11 and rotor 12 constitute body 10 which has a center of mass M preferably located below the center of mass of rotor 12 on axis Y. Center of mass M forms the origin for yaw axis Y, roll axis R, and pitch axis P of body 10, as shown best in FIGURE 4.

As seen in FIGURE 1, body 10 is essentially disc-shaped and constitutes a flying airfoil having a lower aerodynamic surface 13 and an upper aerodynamic surface 14. Yaw axis Y is normally substantially vertical when in flight so that the vector representing the weight of body 10 and passing through center of mass M is aligned with the yaw axis. Basically, body 10 is a radial flow jet engine that has means to direct the jet downward for lift when hovering, aft when flying at high speed, and combinations of aft and down for slow speed flight.

Stator 11 includes payload housing 15 which is generally cylindrical in shape and has a lower portion 16 of substantially greater diameter than upper portion 17. The bottom 18 of housing 15 forms a portion of lower aerodynamic surface 13. Attached to the top of housing 15 is ring 19 having openings 20 spaced around the periphery thereof and extending beyond housing 15. Air scoop 21 is attached to ring 19 to form intake plenum 22. Air scoop 21 has a plurality of openings 23. In the aft portion of scoop 21, intake doors 24 are provided which may be selectively opened or closed to control the quantity of air available to the power plant.

Fitted on housing 15 is fuel tank 25. Tank 25 has a toroidal fuel cell 26 fitted adjacent portion 16 of housing 15, and web 27 extending over housing 15 and into contact with portion 17. Fuel cell 26 may be made in two parts: an upper part 28 integral with web 27 and a lower part 29 attached to part 28 and to bottom 18 of housing 15. Surge baffles having openings therein are also provided in fuel cell 26 in a manner and for the purpose well known to those skilled in the art. On the part of web 27 engaged with portion 17, is inner race 30 which forms the main bearing for rotor 12 to be described presently.

On the peripheral portion of container 26 is propulsion ring 31. Ring 31 is toroidal in shape and consists of combustion chamber 32 defined by a substantially semi-circular wall 33 extending around container 26. As seen in FIGURE 4, combustion chamber 32 is open at the top and is divided into compartments by flame holders 34. Holders 34 are not placed radially in chamber 32, but are inclined with respect to a radial for a purpose to be described hereinafter. Furthermore, holders 34 extend upwardly above the top edges of wall 33. Beneath wall 33 is a thrust plenum chamber divided into four compartments 35 by structural dividers 35'. Compartments 35 are defined by lower plenum chamber wall 36 and curved side walls 37. Flange 31' is used to help attach ring 31 to fuel tank 25. The peripheral rim of ring 31 is formed by curved wall 38 connecting with wall 36. Wall 38 is spaced from wall 37 such that an annular opening 39 is formed therebetween. This opening is substantially the same dimension as the distance flame holders 34 extend beyond the edges of wall 33. Suitable baffles 40 divide the space between walls 37, 38 into four lift nozzle chambers 41 quadrantly spaced around the circumference of body 10. Openings 42 are formed in wall 37 to connect chambers 35 with chambers 41. Control vanes 43 pivotally mounted at 44 on wall 37 close openings 42, but are operable by suitable linkages in a conventional manner for selective movement to the position shown in broken lines in FIGURE 2 wherein annular opening 39 is directly connected to chambers 35. Nozzles 45 in the lower part of nozzle chambers 41 connect the same with the atmosphere so that exhaust gases flow as indicated by arrows $a$ in FIGURE 1. Suitable manipulation of control vanes 43 permits flow entering annular opening 39 to be divided between nozzles 45 and chamber 35 in any ratio.

The structure of chamber 31 so far described is symmetrical about yaw axis Y of body 10. To give meaning to roll axis R and pitch axis P, two horizontal thrust ducts 46, are placed on the pitch axis of chamber 31 removed from each other by 180 degrees; and a yaw duct 47 is placed on the roll axis of ring 31. Each of ducts 46 is connected to two of chambers 35 by duct 46' and has a nozzle 48 to produce a thrust directed perpendicular to the plane of the pitch and yaw axis. Nozzle 48 may be of the type having a variable throat for thrust control. Bi-directional nozzles 49 are connected to duct 47 to produce individually controllable thrusts tangent to ring 31 and perpendicular to the plane of the roll and yaw axes for controlling azimuth heading. Nozzles 49 likewise may have variable throats for thrust control. In addition, two pitch jets 50 are mounted on the pitch axis 180° apart. These jets are connected to pitch jet chambers 51 segregated from lift nozzle chambers 41 by baffles 40. Chambers 51 are very much smaller than chambers 41 so that only a small flow from annular opening 39 enters for control purposes. Such flow is controlled by butterfly valves 52. Also, two roll jets 53 are mounted on the roll axis 180° apart. These jets are connected to roll jet chambers 54 segregated from lift nozzle chambers 41 by baffles 40. The flow through chamber 54 is likewise controlled by butterfly valves. Thus ring 31 is divided into four plenum chambers 35, four lift nozzle chambers 41 and four control chambers 51, 54. Two of the plenum chambers on the left hand of body 10 feed the left horizontal exhaust nozzle 48, and two of the plenum chambers on the right hand of body 10 feed the right horizontal exhaust nozzle 48. The two aft plenum chambers are connected by opening 47' to duct 47 to supply bi-directional nozzle 49. Two lift nozzle chambers are on the left hand and two on the right hand of body 10, each connected to lift nozzles 45. Control chambers are located on the left hand and on the right hand of the pitch axis, and on the forward and aft part part of the body on the roll axis.

Figure 2:
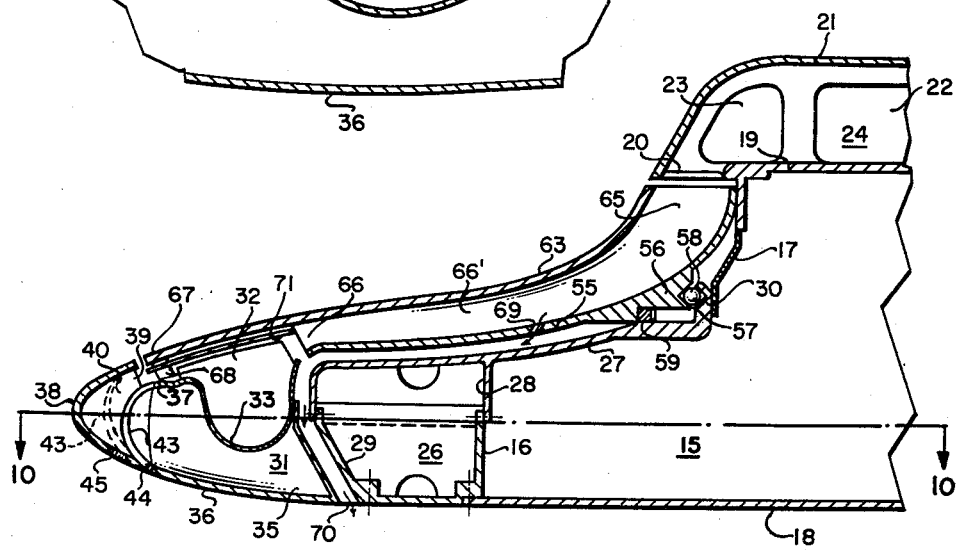
FIGURE 2 is a sectional view of the flying machine showing various interior details.
Figure 5:
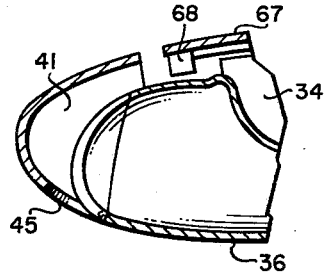
FIGURES 5 and 6 are sectional views taken at the periphery of the flying machine showing the operation of the vanes for distributing the thrust.
Figure 6:
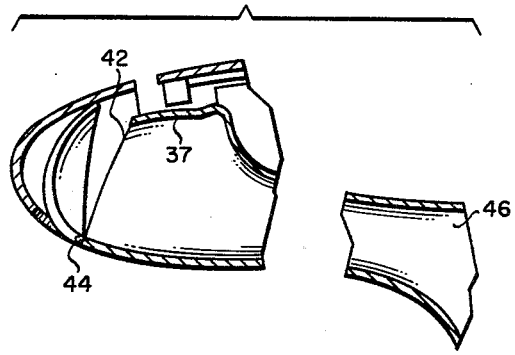
Figure 7:
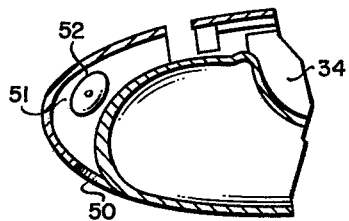
FIGURES 7 and 8 are sectional views taken at the periphery of the flying machine showing the operation of the valves for controlling pitch and roll.
Figure 8:
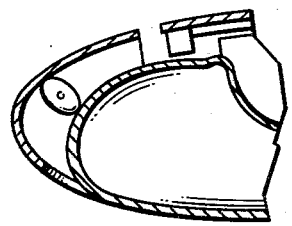
Figure 9:
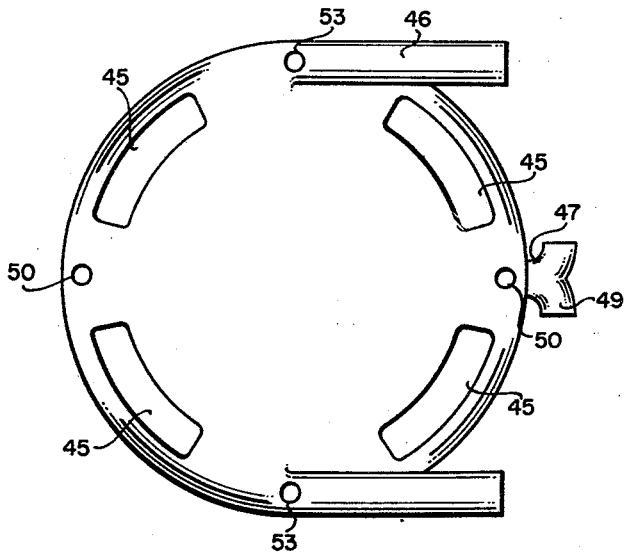
FIGURE 9 is a view of the bottom of the flying machine.

Referring now to rotor 12, FIGURE 2 shows the rotor to have a generally flattened inner surface 55 sweeping down from openings 20 in ring 19 to a position adjacent wall 33 of combustion chamber 32. Surface 55 has thickened portion 56 forming a bearing raceway 57 into which balls 58 are engaged. Adjacent portion 56 is internal ring gear 59. Gear 59 engages pinion 60 on generator 61 which may be attached in recess 62 in housing 15 and form a connection for generator 61. Rotor 12 also has generally flattened outer surface 63 connected to inner surface 55 by compressor vanes 64. Surface 63 sweeps down from the periphery of ring 19 to annular opening 39 of combination chamber 31 and forms the upper aerodynamic lifting surface of body 10. Vanes 64 extend from annular inlet 65 almost to annular outlet 66 to form a compressor 66'. Beyond outlet 66, flame holders 34 extend almost to the inside of outer surface 63, which terminates in peripheral portion 67. Turbine blades 68 are attached to portion 67 and extend into the space between annular opening 39 and baffle 34. Thus, surface 63 structurally interconnects the turbine with the compressor. Bleed holes 69 in inner surface 55 allow cooling air from the compressor 66 to bleed off and enter between surface 55 and web 27 on the fuel tank. This cooling air is vented at 70 and serves to insulate fuel cell 26 from combustion chamber 32. To reduce the skin temperature of the rotor surface 63 directly above combustion chamber 32, a part of the compressed air leaving outlet 66 of compressor 66' is bled through hollow portion 71.

From the above description it is seen that body 10 has four major components so arranged as to form a compact disc shaped flying machine. The components are air scoop 21, rotor or compressor-turbine assembly 12, propulsion ring 31, and fuel tank 25 and payload compartment 15. Body 10 is thus an airframe into which a power plant is integrated. Surface 63 of rotor or compressor-turbine assembly 12 forms a portion of the upper surface of body 10 and acts as a part of the wing or lifting element. In operation, air is taken aboard through openings 23 in air scoop 21. Provision of doors 24 in the aft portion of body 10 allows a maximum amount of air to be made available at take-off, climbing and hovering flight. In high speed flight, aft doors 24 are closed to utilize the ram effect of the air in the intake chamber 22. Intake baffles may be provided in chamber 22 to assist in proper distribution of intake air to the compressor.

Portion 66 of rotor 12 forms a radial flow compressor. Ambient air entering openings 20 in ring 19 passes through inlet 65 of the compressor and is acted upon by vanes 64 such that the air leaving outlet diffuser section 66 is at a higher pressure. From diffuser section 66, the main flow is through combustion chamber 32 where fuel from cell 26 is added and burned. Flame holders 34 not only serve to anchor the flame, but are positioned so that at the design operating speed of compressor 66', air entering combustion chamber 32 flows tangentially to the flame holders as shown by arrows $b$. Thus, no straightening vanes are required in this area. The hot gases produced in combustion chamber 32 pass through turbine blades 68 as shown by arrows $c$. The work extracted from the gases by the turbine is applied to drive the compressor through interconnecting surface 63. The remaining energy left in the exhaust gases leaving blades 68 is utilized to produce a jet thrust. After leaving blades 68, the exhaust gases enter annular opening 39 in ring 31 in a plane substantially parallel with that defined by the pitch and roll axes. By proper design of the turbine blades, the angle at which the gases leave the blades is substantially 90° at the operating point. Thus, the vector representing these gases is aligned with a radial normal to the yaw axis. Most of the gases entering annular opening 39 are guided by walls 37, 38 into nozzle chambers 41. Straightening and turning vanes may be used to assist in controlling the direction of exhaust gas flow. Control vanes 43 proportion the gases between nozzles 45 and plenum chamber 35. The portion expanding through nozzles 45 produces a thrust directed parallel with the yaw axis. The portion of the gases shunted by control vanes 43 into plenum chamber 35 is expanded in horizontal nozzles 48 to produce a thrust directed normal to the yaw axis. Thus, by closing all control vanes, all of the exhaust gases expand through nozzles 45 and produce a thrust which causes body 10 to hover or move vertically, either upwardly or downwardly, depending upon adjustments to the nozzle areas. By opening all control vanes, the gases are directed to nozzles 48 through plenum chambers 35 which are designed to expand in cross-sectional area as nozzles 48 are approached. After flow peripherally around body 10, the gases pass into ducts 46 and are expanded in nozzles 48 to produce a thrust which causes body 10 to be displaced laterally. By selectively controlling the opening of vanes 43, a resultant thrust is produced which allows any desired displacement of body 10. For low speed flight, some use is made of nozzles 45 because the displacement of body 10 at an angle of attack (yaw axis inclined with respect to the vertical) is generally not sufficient to maintain the proper lift to drag ratio. For high speed flight, only nozzles 48 may be used.

A portion of the exhaust gases leaving turbine blades 68 may enter control chambers 51, 54 and be expanded through pitch jets 50 and roll jets 53 so as to maintain the proper attitude of the yaw axis by controlling pitch and roll. In addition, another portion of the exhaust gases may enter duct 47 for expansion through bi-directional nozzle 49. This latter nozzle by suitable controls is used to orient stator 11 about yaw axis Y with respect to the ground in order to achieve a proper azimuth heading. In this manner, displacement of body 10 may occur with its attitude maintained such that yaw axis Y is substantially vertical at all times. The displacement may be vertical, lateral, or a resultant of a vertical and a lateral displacement. Furthermore, a change in azimuth heading of body 10 may be easily accomplished without changing the attitude of yaw axis Y. Thus, sharp alterations in the course of body 10 are easily made without banking. Ascent or descent is likewise achieved without banking. As a result, an extremely maneuverable flying machine is achieved which can maintain its attitude throughout ascent, descent, lateral displacement or any combination of these movements.

Rotation of interconnecting surface 63 with respect to stationary surface 13 will, when there is relative velocity between body 10 and ambient air, produce a measure of lift. Such relative velocity arises even when hovering as a result of the geometric configuration of surface 63 with respect to lift nozzles 45. As the jet thrust emerges from the rim of body 10, it induces a downward flow of air over rotating surface 63. This induced flow increases the lift provided by the jet thrust.

Recalling that the center of mass M of body 10 is located on axis Y below that of rotor 12, and that rotor 12 is rotating about axis Y with respect to stator 11, it will be appreciated that body 10 possesses high inherent stability while hovering. This stability arises because body 10 is virtually a gyroscopic disc carrying a gravity pendulum. As is well known, gyroscopic motion will occur when a body rotates about one of its principal axes of inertia with an angular speed which is very much greater than the speed of precession of the principal axes about some other axis in the body that is not parallel to the principal axes. Yaw axis Y is a principal axis of inertia of rotor 12, and stator 11 corresponds to a pendulous mass since center of mass M of body 10 lies below the center of mass of rotor 12. Thus, when hovering, small deviations of the yaw axis from alignment with the weight vector passing through the center of mass of body 10, which are caused by wind gusts and the like, are self-decreasing as if body 10 were a gyroscope having a pendulum which, after perturbation, would tend to become aligned with the direction of gravitational pull. As a result, while hovering, the equilibrium of body 10 is stable because the forces or moments acting thereon cause a small deviation from the position of equilibrium (yaw axis vertical) to be decreased.

Excellent control while hovering is achieved also by virtue of the fact that there are a plurality of nozzles 45 remote from axis Y located at the rim of body 10. Due to the gyroscopic properties of body 10, rolling or precession of axis Y about roll axis R is corrected not by jets 50 on the pitch axis but by jets 53 on the roll axis. Likewise, pitching or precession of axis Y about pitch axis P is corrected not by jets 53 on the roll axis but by jets 50 on the pitch axis. This paradoxical situation arises because application of a moment about the pitch axis upon selective actuation of jets 53 will produce substantially no movement of the yaw axis about the pitch axis but will result in precession of the yaw axis about the roll axis due to the rotating mass of rotor 12. The tremendous inherent stability of body 10 in pitch and roll provided by the high angular momentum of rotor 12 greatly simplifies the static stability problems in these axes. For example, a rotor having a polar moment of inertia of 20 slug-feet$^2$ rotating at 3,000 r.p.m. has an angular momentum of 6,300 lb.-ft.-sec. An unbalanced moment of 100 lb.-ft. acting about a diameter of the disc for 30 seconds will produce an angular precession about a perpendicular diameter of only 27 degrees. Were the disc not rotating, the same angular deflection is produced in 0.3 second. This means that body 10 would roll only one-one hundredth the rate of an aircraft of similar mass moment of inertia when disturbed by a gust or other air load.

Those skilled in the art will now appreciate that this invention provides a flying machine which can take off and land, hover, travel at high speeds, and quickly turn and maneuver in azimuth heading. By incorporating the power plant into the basic structure, considerable weight for a given overall performance is saved. When all or part of the thrust produced by the engine is directed aft, the flying machine is displaced in a manner similar to that of a conventional flying machine. Aerodynamic lift is produced on the disc shaped body during forward flight by air flow over the airfoil-like section of the body. Thus, there there is no sacrific in performance even though a considerable part of the airframe has been eliminated and replaced by a specially integrated power plant. At very low speeds, lift produced by the airfoil may be added to by directing the jet thrust in a downward direction.

It will also be recognized by those skilled in the art that displacement and control of the flying machine can be achieved by selectively producing angular moments about the pitch, roll and yaw axes to control the lift to thrust ratio, and by selectively regulating the fuel flow into the combustion chamber. Pitch and roll moments are provided by the small jets located in the lower peripheral portion of the stator which vent downwardly, a small portion of the turbine exhaust gases. Control is achieved by varying the mass flow through the nozzles. Two jets are mounted 180 degrees from each other on both the roll and pitch axes. Because of the gyroscopic effect of the rotor, the jets to control pitch are on the roll axis, and the jets to control roll are on the pitch axis. Yaw moments are provided by a variable flow, bi-directional tangential jet located at the rear of the stator between the two exhaust ducts. This latter jet vents some of the turbine gases tangentially, and serves to balance turning effects due to aerodynamic loading and bearing forces from the rotating compressor. In addition, azimuth heading of the flying machine is controlled by this jet by proper orientation of the two exhaust ducts.

What is claimed is:

1. In combination, a stator having an axis, a rotor mounted on top of said stator for rotation about said axis, said stator and rotor constituting a body having upper and lower aerodynamic surfaces for producing lift, means on said rotor for drawing air therethrough to increase its pressure, burner means associated with said body for increasing the energy level of air leaving said rotor, turbine means responsive to air leaving said burner means for converting some of the energy thereof into a mechanical output, nozzle means responsive to air leaving said turbine for converting some of the energy thereof to a thrust adapted to displace said body, and means interconnecting said rotor with said turbine means for applying said output to said rotor, said last named means including a part of said upper aerodynamic surfaces.

2. The combination of claim 1 wherein said nozzle means is adjustable to direct said thrust at variable angles with respect to said axis for controlling the direction of displacement of said body.

3. In combination, a stator, a rotor rotatably mounted on top of said stator, said stator and rotor constituting a body having yaw, pitch, and roll axes with said rotor being rotatable about said yaw axis, upper and lower aerodynamic surfaces on said body for producing lift, means on said rotor for drawing air therethrough to increase its pressure, burner means associated with said body for increasing the energy level of air leaving said rotor, turbine means responsive to air leaving said burner means for converting some of the energy thereof into a mechanical output, means interconnecting said rotor with said turbine means to apply said output to said rotor for causing it to rotate with respect to said stator, nozzle means responsive to air leaving said turbine for converting some of the energy thereof to a thrust, first control means to selectively direct a part of said thrust for producing a moment on said body substantially only about its pitch axis, second control means to selectively direct a part of said thrust for producing a moment on said body substantially only about its roll axis, and means on the rotating parts of said body when rotating responsive to actuation of said first control means for producing rotation of said body about its roll axis without substantial accompanying rotation of said body about its pitch axis and to actuation of said second control means for producing a rotation of said body about its pitch axis without substantial accompanying rotation of said body about its roll axis, whereby the attitude of said yaw axis may be controlled.

4. The combination of claim 3 wherein said means interconnecting said rotor with said turbine includes a part of said upper aerodynamic surface.

5. In combination, a stator having an axis, a rotor mounted on top of said stator for rotation about said axis, said stator and rotor constituting a body having upper and lower aerodynamic surfaces for producing lift, means on said rotor for drawing a continuous flow of air through said rotor to increase its pressure, burner means associated with said body for increasing the energy level of the air leaving said rotor, turbine means responsive to air leaving said burner means for converting some of its energy into a mechanical output, means interconnecting said rotor with said turbine means for applying said output to said rotor, a plenum chamber operatively associated with said turbine means having inlet means by which enters air leaving said turbine means, adjustable nozzle means on said plenum chamber for producing upon flow of air therethrough a thrust having components parallel to said axis and normal to said axis, and means selectively movable to control the flow of air through said nozzle means, said means interconnecting said rotor with said turbine means including a part of said upper aerodynamic surfaces.

6. A flying machine comprising a stator having an axis, a rotor mounted on top of said stator for rotation about said axis, said stator having a surface of revolution generated about said axis, said rotor having a surface of revolution generated about said axis, the aforementioned surfaces of revolution defining the exterior of said flying machine and forming aerodynamic surfaces capable of producing lift upon movement of air relative thereto, said rotor being mounted on said stator so that the surface of revolution of said rotor constitutes the upper aerodynamic surface of said flying machine and the surface of revolution of said stator constitutes the lower aerodynamic surface, and means on said rotor for causing it to rotate about said axis.

7. A flying machine comprising a stator having an axis, a rotor mounted on top of said stator for rotation about said axis, said stator having a surface of revolution generated about said axis, said rotor having a surface of revolution generated about said axis, the aforementioned surfaces of revolution defining the exterior of said flying machine and forming aerodynamic surfaces capable of producing lift upon movement of air relative thereto, said rotor being mounted on said stator so that the surface of revolution of said rotor constitutes the upper aerodynamic surface of said flying machine and the surface of revolution of said stator constitutes the lower aerodynamic surface, compressor means on said rotor, combustion chamber means on said stator, rotation of said rotor causing said air compressor means to supply compressed air to said combustion chamber means, combustion of fuel in said combustion chamber means producing high energy gases, turbine means on said rotor through which said gases pass, a portion of the energy of said gases being converted by said turbine means into mechanical energy which rotates said rotor, plenum chamber means through which said gases pass after leaving said turbine means, and nozzle means connected to said plenum chamber means, the gases in said plenum chamber means adapted to expand through said nozzle means for converting a portion of the energy of the gases into thrust which reacts upon said machine for propelling the same.

References Cited in the file of this patent
UNITED STATES PATENTS

| | | |
|---|---|---|
| 2,807,428 | Wibault | Sept. 24, 1957 |
| 2,850,250 | Smith | Sept. 2, 1958 |

FOREIGN PATENTS

| | | |
|---|---|---|
| 770,873 | Great Britain | Mar. 27, 1957 |